United States Patent [19]
Bertheux et al.

[11] Patent Number: 5,653,407
[45] Date of Patent: Aug. 5, 1997

[54] GEOCENTRIC POINTING THREE-AXIS STABILISED SATELLITE IN LOW ORBIT WITH SINGLE-AXIS STEERABLE SOLAR GENERATOR

[75] Inventors: Philippe Bertheux, Roquefort les Pins; Jérôme Jarlier, Mandelieu; Guy Darmon, Grasse le Plan; Sylvain Le Muet, Cannes la Bocca, all of France

[73] Assignee: Societe Nationale Industrielle et Aerospatiale, France

[21] Appl. No.: 306,601

[22] Filed: Sep. 15, 1994

[30] Foreign Application Priority Data

Sep. 23, 1993 [FR] France ..................... 93 11340

[51] Int. Cl.$^6$ .......................................... B64G 1/24
[52] U.S. Cl. .......................... 244/168; 244/173
[58] Field of Search ............... 244/158 R, 164, 244/168, 173

[56] References Cited

U.S. PATENT DOCUMENTS

| | | | |
|---|---|---|---|
| 4,133,501 | 1/1979 | Pentlicki | 244/173 |
| 4,371,135 | 2/1983 | Keigler | 244/173 |
| 4,508,297 | 4/1985 | Mouilhayrat | 244/173 |
| 4,732,354 | 3/1988 | Lievre | 244/168 |
| 4,759,517 | 7/1988 | Clark | 244/168 |
| 4,830,097 | 5/1989 | Tanzer | 244/173 |
| 4,858,858 | 8/1989 | Bruederle | 244/165 |

FOREIGN PATENT DOCUMENTS

| | | | |
|---|---|---|---|
| 0001637 | 5/1979 | European Pat. Off. . | |
| 0237296 | 9/1989 | Japan | 244/173 |
| 0234899 | 9/1990 | Japan | 244/173 |

OTHER PUBLICATIONS

Proceedings of the European Space Power Conference, vol. 2, Aug. 1989, pp. 783–788, "The Solar Array of Japanese Solar Observatory Satellite 'Solar–A'".

Proceedings of the European Space Power Conference, vol. 2, Aug. 1989, pp. 573–584, "Solar Array Designs for Columbus Elements".

*Primary Examiner*—Galen L. Barefoot
*Attorney, Agent, or Firm*—Remy J. VanOphem; Thomas A. Meehan; John VanOphem

[57] ABSTRACT

A satellite stabilized about a roll axis, a yaw axis and a pitch axis, for travel on an orbit with geocentric pointing towards a heavenly body, embodying a body and a solar generator adapted to collect solar radiation, characterized in that the generator includes a single wing supported in a medium portion by an arm extending at least approximately along the yaw axis away from the heavenly body, the arm being connected to the body by a single rotation mechanism with a single rotation axis substantially parallel to the yaw axis, the wing having a constant inclination $\alpha$ to the yaw axis.

12 Claims, 2 Drawing Sheets

GEOCENTRIC POINTING THREE-AXIS STABILISED SATELLITE IN LOW ORBIT WITH SINGLE-AXIS STEERABLE SOLAR GENERATOR

BACKGROUND OF THE INVENTION

1. Field of the Invention

The invention concerns a geocentric pointing three-axis stabilized satellite configuration for any orbit (possibly heliosynchronous, preferably but not necessarily steeply inclined and/or of low altitude); it is more particularly directed to the location and the kinetics of its solar generator.

2. Description of the Prior Art

A satellite has two parts: a platform including the various equipment necessary to the control and the operation of the satellite (including attitude and orbit control and electrical power supply systems) and a payload embodying various equipment for carrying out the specific mission of the satellite (these can include observation (remote sensing) or telecommunications equipment).

Satellite payloads require an input of electrical power usually supplied by a solar generator including photo-voltaic cells illuminated by the Sun (except when the satellite is in an eclipse).

The orientation of the solar generator(s) can be steered so that the solar cells are perpendicular to the Sun (or as close as perpendicular thereto as possible) in order to recover the maximal power and consequently to minimize the surface area of the solar generator required. The orientation depends on which side of the satellite carries the solar generator and its mechanism: it therefore depends on the configuration of the satellite.

In low orbit the increased diameter of the Earth at the equator and the resulting terms of the terrestrial attraction potential cause rotation—referred to as nodal regression—of the line of the nodes of the orbit (where the orbital plane intersects the equatorial plane) whose speed is given by an equation linking the semi-major axis a, the inclination i and (second order effects) the eccentricity e of the orbit.

In a heliosynchronous orbit nodal regression is used to exactly compensate the rotation of the Earth around the Sun (once per year) so that the satellite illumination conditions remain constant. This heliosynchronous property is particularly beneficial for optical observation satellites.

This kind of orbit considerably simplifies the problems of orienting the solar generator: a single rotation axis is sufficient to maintain the cells perpendicular to the Sun at all times.

However, although this type of orbit is well suited to optical observation missions, it can have undoubted drawbacks for other missions, due, in particular, to the fact that the satellite always overflies a given location at the same local time.

For this reason, in certain missions, it can be much better from the operational point of view to choose a non-heliosynchronous orbit (orbit of any kind); however, it can be shown that it is then always necessary to provide two degrees of freedom in rotation to keep the solar generator perpendicular to the Sun at all times. This is because it is necessary to compensate for the following two rotations:

nodal regression of the orbit relative to the direction of the Sun (non-heliosynchronism); and rotation of the satellite in its orbit so that one side is always pointed towards the Earth.

The invention applies to this type of orbit, preferably but not necessarily a low orbit.

A satellite which rotates in its orbit is usually stabilized in a particular attitude chosen to suit its mission. In the case of geocentric satellite attitude, stabilization keeps a so called Earth side of the satellite facing towards the Earth, i.e. perpendicular to the geocentric direction (usually called the Z direction). The payload (antennas, instruments, optical devices, etc.) is usually located on the Earth side (or +Z side). The opposite side is called the anti-Earth side (or −Z side).

Depending on the geocentric stabilization mode adopted, the satellite may or may not retain a fixed attitude relative to the geocentric direction and the orbit. If the attitude relative to the orbit can vary, there is one degree of freedom in rotation about Z, which can be exploited to keep the solar generator perpendicular to the solar radiation. However, to fulfill their mission some payloads must remain in an appropriate attitude both relative to Z and relative to the orbit, which is incompatible with one degree of freedom in rotation about Z. The satellite must then be stabilized about three axes (not only the Z axis, but also the roll axis X and the pitch axis Y) relative to its orbit.

The invention applies to this type of satellite configuration.

Examples of satellites in low orbit are given in European Patent No. 0,195,553. Another is the METEOR satellite.

European Patent No 0,195,553 describes an orbital flight satellite with two possible modes of attitude pointing, namely an Earth-pointing (geocentric) mode and a Sun-pointing mode. The satellite has an elongate cylindrical body and two solar generator wings or arrays extending transversely to the body and articulated to a middle portion thereof. In Earth-pointing mode the axis of the body is parallel to the geocentric direction. The two wings are usually aligned with each other but can be disposed one beside the other if two bodies are fixed together.

To allow this the wings can rotate 90° about the axis. In normal service, for tracking the solar direction, each wing also turns about its longitudinal axis and about an axis perpendicular to the plane of the axis of the body and the longitudinal axis. It is clear that any such solution is complex (there are three degrees of freedom for the arrays with necessarily complex drive devices, likely to lead to serious malfunctions); moreover, there is no provision to minimize shading of the wings by the body of the satellite or its equipment and the existence of any such risk of shading implies over-rating of the solar generator, and thus of the number of solar cells, to guarantee an adequate supply of electrical power to the remainder of the satellite at all times. Finally, this configuration implies the provision in the satellite body itself of a non-negligible space to allow for the various angular movements of the wings. This can lead to problems in the implementation of the payload.

The METEOR satellite has a satellite body and two solar generator wings aligned with each other transversely to the body and mounted on a gantry joined to the body by a guide mechanism mounted on the anti-Earth side and having a rotation axis coincident with the geocentric direction. The wings are inclined to the plane defined by the geocentric direction and the direction in which the wings extend. This configuration has drawbacks including the fact that, even though in service the wings require fewer degrees of freedom, their deployment (in combination with the gantry) necessitates complex movements, all the more so in that the body of the satellite is a cylinder which is elongate in the geocentric direction. What is more, the fact that the arrays and their gantry turn around the satellite body requires the body to have similar dimensions in orthogonal positions transverse to the geocentric direction.

SUMMARY OF THE INVENTION

The invention relates to a three-axis stabilized geocentric pointing satellite in any orbit (possibly but not necessarily a heliosynchronous orbit) around the Earth or more generally around a heavenly body, having a generator with a simple stowed configuration allowing efficient use of the space available under the nose-cone of a launch vehicle, which is easily and reliably deployable, which is easily and reliably controllable in service, which has no fragile and complex articulation or rotation device, and whose location or implementation allows modest over-rating of the generator for a given nominal power, combined with a substantial useful surface area on the anti-Earth side for the installation of payload equipment such as thermal radiators or heatsinks, which satellite can be used in a low orbit.

To this end the invention proposes a satellite stabilized about its roll axis (X), its yaw axis (Y), and its pitch axis (Z), for an orbital flight with geocentric pointing towards a heavenly body. The satellite embodies a body and a solar generator adapted to collect solar radiation, characterized in that the generator includes a single array or wing supported centrally by an arm extending at least approximately along the yaw axis away from the heavenly body, the arm being connected to the body by a single rotation mechanism with a single rotation axis substantially parallel to the yaw axis, the wing having a constant inclination to the yaw axis.

In accordance with preferred features of the invention, some of which may be combinable with others:

the rotation axis of the single mechanism is at least approximately in the roll-yaw plane; this has the advantage of a configuration which is symmetrical about the roll-yaw plane, minimizing any disturbing torque due to atmospheric drag (in Earth orbit), solar radiation pressure and the gravity gradient, for example;

the center of mass of the solar generator is at least approximately in the roll-yaw plane; this has the advantage of minimizing disturbing torques during rotation of the solar generator about Z;

the rotation axis of the mechanism is near an edge of the anti-heavenly body side of the satellite body, which facilitates implementation of the wing and its arm in the stowed configuration;

the wing is formed by an odd number of panels including a center panel to which the arm is connected, which facilitates stowing and deploying the array;

the wing is formed of panels whose shape and dimensions are close to the shape and dimensions of the anti-heavenly body side, which facilitates stowing the combination of the satellite body and its folded solar generator under the nose-cone of the launch vehicle;

the constant inclination is between 30° and 35° for low orbit altitudes between approximately 600 km and approximately 1,000 km, independently of the inclination of the orbit;

the satellite includes an attitude control device including a non-null mean kinetic moment momentum wheel whose axis is at least approximately parallel to the pitch axis; this is possible because the configuration of the satellite of the invention as defined hereinabove minimizes disturbing torques about the roll and yaw axes; the pitch axis is virtually an inertial axis (bear in mind that the pitch axis must be kept perpendicular to the plane of the orbit) and any disturbing torques about the pitch axis can be compensated by the momentum wheel; the latter also controls attitude in pitch and, by virtue of its gyroscopic stiffness, coupled control of the roll and yaw angles; this has the advantage over prior art solutions of minimizing the number of wheels needed for satellite attitude control; and at least one heatsink or thermal radiator is disposed on the anti-heavenly body side or on the "heavenly body" side, benefiting from the large surface area that these sides can have; the anti-heavenly body side has a high heat rejection capacity, greater than that of the heavenly body side, but sees more of the Sun; equipment moderately sensitive to the thermal gradient can be installed on this side; components excessively sensitive to the thermal gradient are preferably installed on the heavenly body side.

Objects, features and advantages of the invention emerge from the following description given with reference to the appended drawings.

DETAILED DESCRIPTION OF THE PREFERRED EMBODIMENT

Figure 1:
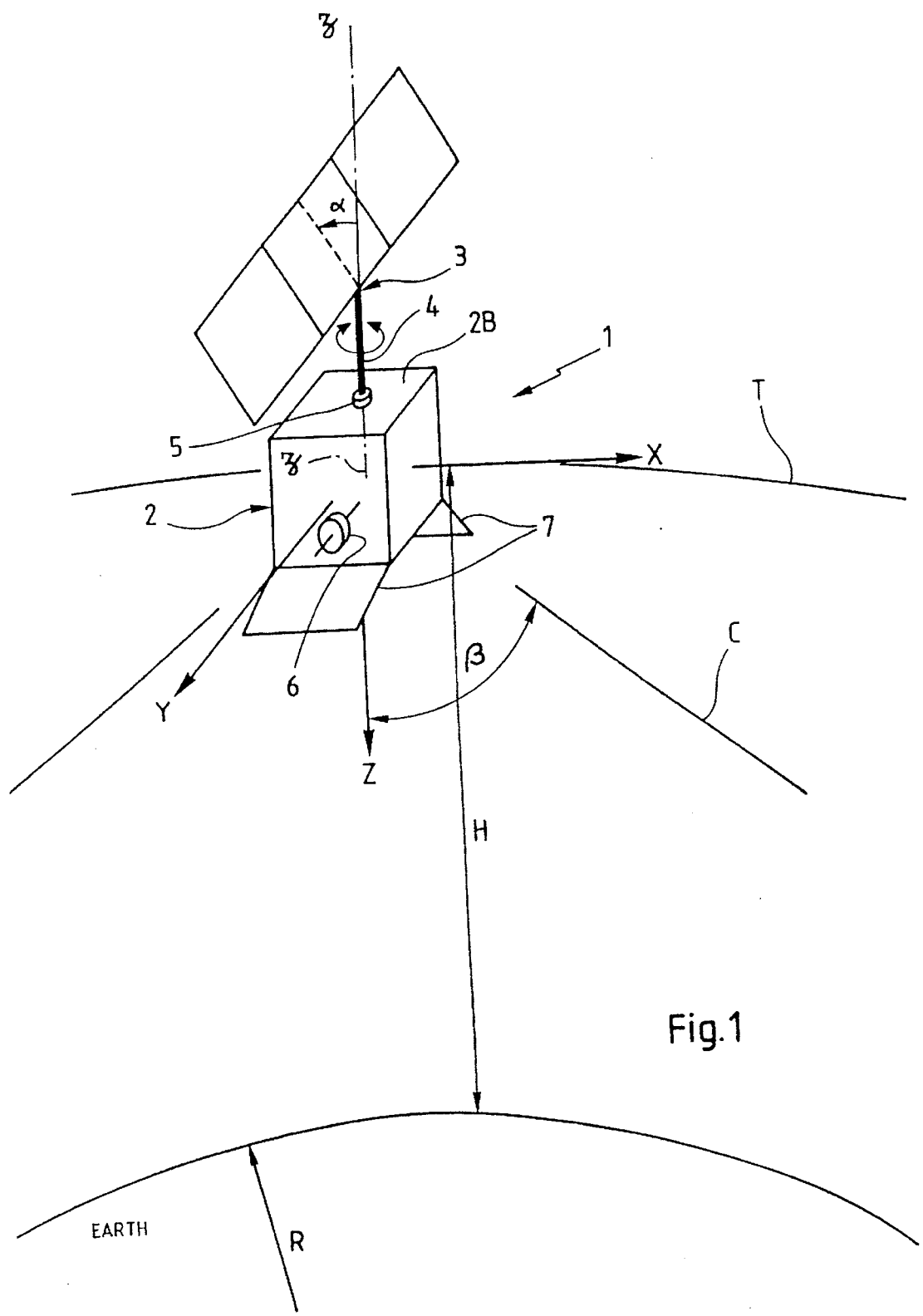
FIG. 1 is a diagram showing the principle of a satellite in accordance with the invention.

FIG. 1 shows a satellite 1 in an orbit T around the Earth (the invention can be generalized without difficulty to other celestial or heavenly bodies such as the Moon, for example).

The satellite 1 has three main axes of inertia one of which, the yaw axis Z, is kept pointed towards the Earth in the local geocentric direction: the satellite is therefore a geocentric pointing satellite.

The satellite is stabilized about its three axes, i.e., not only about the yaw axis Z but also about the pitch axis Y, which has to remain perpendicular to the plane of the orbit, and the roll axis X perpendicular to the Y and Z axes and in the same direction as the instantaneous speed of the satellite in its orbit, the trihedron XYZ constituting a direct orthonomic frame of reference.

From the satellite the Earth occupies a cone C whose axis is coincident with the geocentric direction and whose half-angle $\beta$ is determined by the altitude H of the satellite according to the following equation:

$$\sin \beta = R/(R+H)$$

in which R is the radius of the Earth. This angle is approximately 55° for a circular orbit at an altitude of 1,400 km, for example.

Thus solar radiation cannot come from this "terrestrial cone" (if the direction of the Sun is within this cone the solar radiation is blocked by the Earth: the satellite is then in eclipse). However, in any low orbit solar radiation can reach the satellite in any direction outside this cone throughout the year.

The size of the terrestrial cone and therefore the magnitude of the eclipse phenomenon is inversely proportional to the altitude of the (usually circular) orbit. Given that the invention allows for the eclipse phenomenon (see below), the invention is therefore particularly beneficial in the case of low orbits (with altitudes typically in the order of a few hundred to a few thousand kilometers, usually between 500 km and 10,000 km).

The satellite 1 has a body 2 and a solar generator 3 designed to capture solar radiation. In accordance with the invention, the generator 3 embodies a single wing or array joined to the body by an arm 4 extending at least approximately along the yaw axis away from the Earth, i.e. substantially in the −Z direction. The arm 4 is connected to an anti-Earth side 2B of the satellite body by a single drive mechanism 5 providing a single degree of freedom in service (it is therefore a single-axis mechanism), namely rotation about a single axis z—z substantially parallel to the direction −Z.

The arm 4 is connected to a middle portion of the wing.

In the example shown this middle portion is at the center of one maximal length side of the wing (in practice the maximal direction of the wing is transverse to the yaw axis Z). In an alternative embodiment (not shown) this middle portion is at the center of the wing but the FIG. 1 configuration may be preferable for easier stowing and a greater distance of the wing from the body in service.

Having the drive mechanism 5 on the anti-Earth side has the advantages of avoiding any turning over maneuver of the satellite when the Sun crosses the orbital plane and of optimal exposure of the Earth side on which the payload is usually installed.

This configuration is rugged in that there is only one mechanism 5 for the solar generator 3 and this is a single-axis mechanism.

The wing is at constant angle $\alpha$ to the yaw axis typically between 25° and 40°.

Assuming (see above) that the directions of incidence of solar radiation relative to Z are equally probable in time, it can be shown that maximum energy is collected over a long period by making $\alpha=\beta/2$, which yields values of $\alpha$ between 30° and 33° for circular orbits at altitudes between 600 km and 1,000 km. It is to be noted here that this inclination is chosen independently of the inclination of the orbit.

If $\phi$ is the solar flux the mean flux, $\phi m$ collected by the solar generator can be approximated by the equation:

$$\phi m = \phi \cdot \cos \alpha/(\pi/2-\alpha)$$

This type of kinematics (rotation of the solar generator about z—z) is particularly well suited to steeply inclined orbits, typically for orbit inclinations exceeding 60°.

The concept is nevertheless valid for less steeply inclined orbits, but there exist different kinematics which are better from the energy point of view, for example rotation about the Y axis, although in this case controlling the inclination of the wing is dependent on the inclination of the orbit.

The angle of inclination can be optimized allowing for the orbit to maximize (at all times and in all seasons) the mean power received per orbit. It can be shown that the over-rating of the cell surface area is no more than around 20% of the strict minimum, i.e. compared to a solar generator with two rotation axes perpendicular to the Sun at all times (which amounts to saying that the mean viewing factor per orbit is always greater than or equal to 0.8, except when in eclipse).

The satellite includes an Attitude and Orbit Control System (AOCS) of any appropriate known type. Nevertheless, this system is advantageously of the type with a non-null mean kinetic moment momentum wheel 6 whose axis is at least approximately oriented along the pitch axis Y (which it must be remembered remains perpendicular to the plane of the orbit).

The satellite includes various equipment such as antennas 7 facing the Earth.

Figure 2:
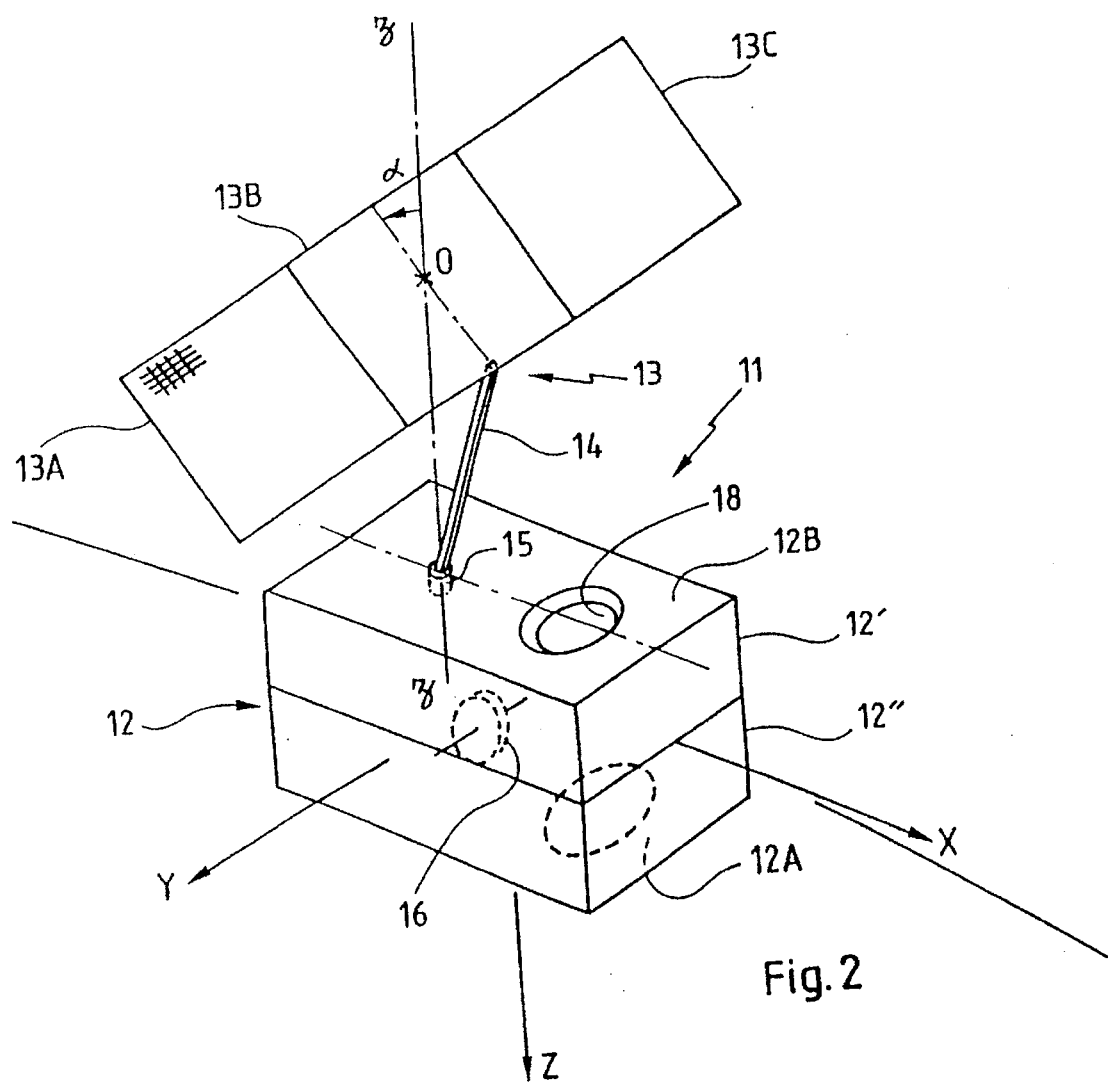
FIG. 2 is a perspective view of one embodiment of a satellite in accordance with the invention.
Figure 3:
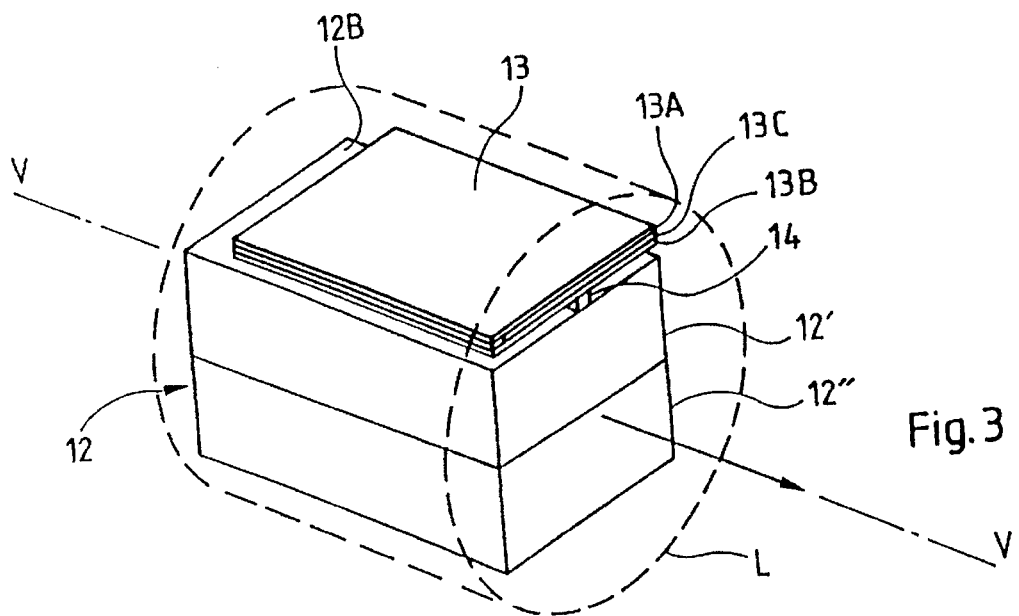
FIG. 3 is a perspective view of the satellite from FIG. 2 in the stowed configuration under the nose-cone of a launch vehicle.

FIGS. 2 and 3 show a satellite of the type illustrated in FIG. 1 in more detail, but with the antennas removed. Components similar to components in FIG. 1 are identified by the same reference number increased by 10.

The body 12 embodies a platform 12' and a payload 12" facing the Earth. The anti-Earth side 12B is therefore part of the platform while the side 12A is part of the payload.

The rotation axis z—z of the drive mechanism 15 is at least approximately in the roll-yaw plane (the plane of the X and Z axes).

The center of mass O of the solar generator is preferably at least approximately in the roll-yaw plane. To this end the center of mass is advantageously at least approximately on the z—z axis.

These features confer a symmetry benefiting efficient attitude control by the momentum wheel 16 (additional wheels can naturally be provided, running in practice at speeds that can assume positive or negative values, as required).

The drive mechanism 15 is preferably near one edge of the anti-Earth side of the body, this edge being in practice preferably parallel to the pitch axis in order to conform to the previously mentioned symmetrical arrangement. This has the advantage of allowing disposition of the arm along the median line parallel to the roll axis in the stowed configuration (see FIG. 3).

The greater the distance from the drive mechanism to the extreme edge of the anti-Earth side (opposite the edge near which the drive mechanism is installed), the longer can the arm be without projecting beyond the overall size of the body when stowed and the greater the distance between the single wing and the body provided in service by the arm. This distance can naturally be increased if the arm is telescopic, but an arm of constant length may be preferable for reasons of ruggedness and simplicity.

This explains why it can be beneficial for the dimension of the anti-Earth side along the roll axis to be greater than its dimension along the pitch axis.

The single solar generator wing is advantageously made up of an odd number of solar panels 13A, 13B, 13C (three panels in this example), including a center panel 13B to which the arm 14 is connected. In the folded configuration the center panel is adjacent the body (see FIG. 3) and the other panels are folded over it, in this example the panel 13C being folded under the other end panel 13A. The person skilled in the art knows how to adapt this arrangement for an odd number of panels greater than or equal to five.

The shape and the dimensions of the panels 13A and 13C are advantageously close to the shape and the dimension of the anti-Earth side (in FIG. 3 the panels are slightly shorter in the direction of the roll axis than the anti-Earth side 12B and therefore than the body). In the stowed configuration the (body+wing) combination is therefore compact and easily accommodated within the volume L allowed for the satellite under the nose-cone of a launch vehicle.

The greatest dimension of the body plus folded wing combination, in this example the dimension along the roll axis, is preferably oriented under the nose-cone of the launch-vehicle parallel to the launch vehicle axis V—V; for a given satellite this minimizes the volume L which must be allocated to it for proper deployment.

Given the larger surface area of the anti-Earth side and the Earth side of a satellite according to the invention, the anti-Earth side is available for installing equipment designed to face away from the Earth, such as thermal radiators like a heatsink 18 as illustrated in FIG. 2. The Earth side can also be used to install other equipment, such as heatsinks and other devices.

The satellite dimensions can be as follows, for example (the mechanism being more eccentric than as shown in FIG. 2):

body dimension along X axis : 3 m body dimension along Y axis : 2 m platform dimension along Z axis : 1 m solar wing panel dimensions : 2×3 m² arm length : 3 m overall size of unfolded configuration (platform+arm+array) : 5 m approx.

One skilled in the art can determine how to slave rotation of the solar generator about the z—z axis by extrapolation from existing solutions. This is not a direct part of the invention and will not be described in detail here. Likewise for attitude control using the momentum wheel or other prior art principles and various prior art sensors (not shown).

It goes without saying that the foregoing description has been given by way of non-limiting example only and that numerous variants thereof can be put forward by one skilled in the art without departing from the scope of the invention.

What is claimed is:

1. A satellite (1, 11) stabilized about a roll axis (X), a yaw axis (Z) and a pitch axis (Y), for a travel on an orbit (C) with geocentric pointing and having a side facing toward a heavenly body and a side facing away from the heavenly body, the satellite, comprising:

a body (2, 12); and a solar generator (3, 13) for collecting solar radiation emitted by a star wherein the generator (3, 13) comprises:

a wing supported about an average position; and an arm (4, 14) extending at least approximately along the yaw axis in a direction away from the heavenly body, the arm being connected to the body by a rotation mechanism (5, 15) having a rotation axis substantially parallel to the yaw axis, the wing having a constant inclination ($\alpha$) to the yaw axis.

2. A satellite according to claim 1 wherein the rotation axis of the rotation mechanism (5, 15) is at least approximately in the roll-yaw plane.

3. A satellite according to claim 1 wherein the center of mass of the solar generator (3, 13) is at least approximately in the roll-yaw plane.

4. A satellite according to claim 1 wherein the axis of rotation of the rotation mechanism is located near an edge of the side of the satellite facing away from the heavenly body.

5. A satellite according to claim 1 wherein the wing comprises an odd number of panels (13A, 13B, 13C) including a center panel, wherein the arm extending along the yaw axis is connected to the center panel.

6. A satellite according to claim 5 wherein the center panel has a first edge and the arm is fixed to the first edge of the center panel.

7. A satellite according to claim 1 wherein the wing is formed of panels, each panel having a shape and dimensions corresponding to the shape and dimensions of the side facing away from the heavenly body.

8. A satellite according to claim 1 wherein the constant inclination ($\alpha$) of the wing is between 30° and 35°, the satellite is in a low orbit altitude of between approximately 600 km and approximately 1000 km, independently of the inclination of the orbit.

9. A satellite according to claim 1 further comprising an attitude control device including a non-null mean kinetic moment momentum wheel (6, 16) having an axis at least approximately parallel to the pitch axis (Y).

10. A satellite according to claim 1 further comprising at least one thermal radiator (18) disposed on the side of the satellite facing away from the heavenly body.

11. A satellite according to claim 1 further comprising at least one thermal radiator (18A) disposed on the side of the satellite facing the heavenly body.

12. A satellite according to claim 1 wherein the side facing away from the heavenly body has a dimension along the roll axis (X) greater than the dimension of the same side along the pitch axis.

* * * * *